Nov. 23, 1943.  D. INGALLS  2,334,706
CONDUIT CLAMP
Filed May 27, 1941
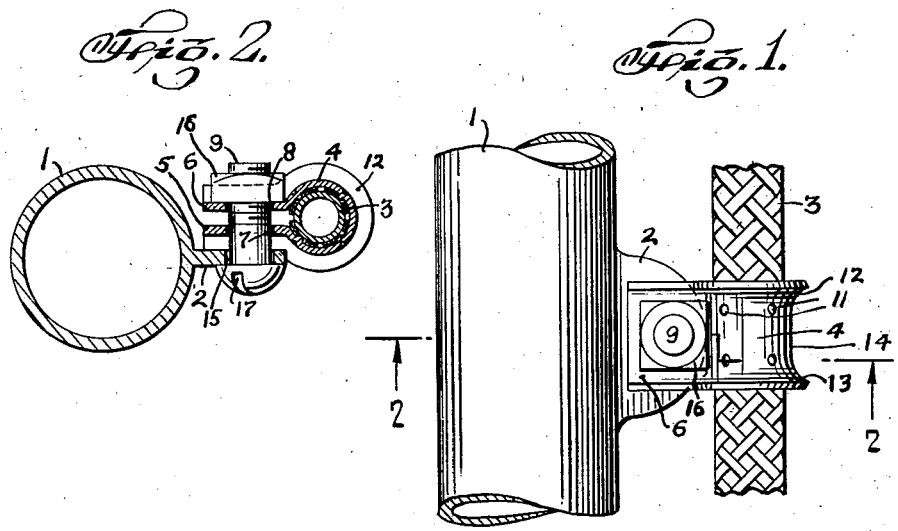
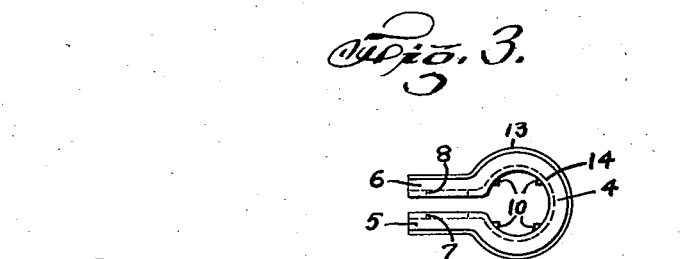
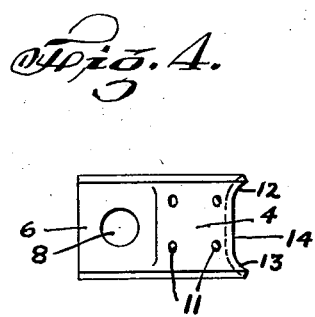
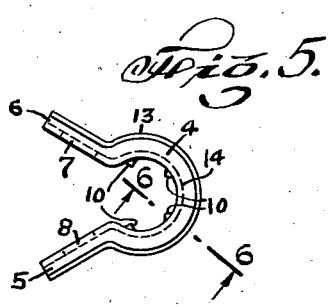
David Ingalls INVENTOR
BY Thomas Howe ATTORNEY Patented Nov. 23, 1943

2,334,706

UNITED STATES PATENT OFFICE 2,334,706

CONDUIT CLAMP

David Ingalls, Westfield, N. J., assignor to Titeflex Metal Hose Co., a corporation of New Jersey Application May 27, 1941, Serial No. 395,428

3 Claims. (Cl. 24—135)

This invention relates to means for securely clamping a body, such as a tube or rod, to a support.

While the invention may have any application in which it may be useful, it is especially intended to secure to internal combustion engines, particularly those on aeroplanes, the radio shielding conduit for the ignition wires of the engine. Such conduit may consist of a flexible, corrugated, metal tube surrounded by a braided covering of metal strips as shown for instance in the patent to Louis H. Brinkman No. 1,340,818. Such conduit may be secured to a support by a clamp comprising an encircling band of flat, metal strip having ears at its ends through which the bolt passes to draw the encircling band tightly about the conduit and to secure it to a support.

It is of advantage that such strip should be made thin so as to be more readily workable by dies, punches or otherwise, and so that it shall be light in weight which is an important consideration in connection with apparatus on aeroplanes. It is of advantage that such clamps, particularly in relation to the character of tube specified, should have projections extending inwardly from the conduit encircling portion, to more securely hold the conduit, and such projections whether made in a die or by a "prick punch," are more readily formed when the metal strip forming the clamp is thin than when it is relatively thick.

When, however, the clamp is rectilinear in cross section and the metal is very thin it is so easily distorted, that the conduit cannot be securely clamped and when projections upon the interior of the encircling portion as referred to, are employed, such projections cannot be firmly driven against the conduit.

It is an object of the present invention to provide a clamp formed of thin metal as referred to which shall be of firmer construction and so not so easily distorted. This is accomplished by making the strip forming the clamp concave in cross section, and by "concave" herein is meant having a depression intermediate the extremities whether the boundary lines of such concavity are straight or curved or partly straight and partly curved.

This concavity of the clamp strip causes the clamp to be firmer and better hold its form whereby it, with the inwardly extending projections, if present, may be firmly and securely drawn into operation with relation to the conduit, and the whole clamping of the conduit to its support is firm and secure.

Where the strip forming the encircling portion of the clamp is rectilinear in cross section, the edges of the clamp bear closely against the conduit and are liable to cut into or wear the conduit especially where a conduit with a braided covering, as referred to, is employed.

It is a further object of the invention to provide against such wearing or cutting of the conduit by the clamp, by causing the marginal portions of the strip to be bent or extend outwardly.

It is desirable that the clamp should contact firmly and securely with the conduit, and it is a further object of the invention to provide such co-operation of the clamp and conduit by making a considerable part of the intermediate portion of the cross section of the clamp strip straight so that it lies flatly upon the conduit for a considerable portion of the width of the clamp notwithstanding the marginal portions are positioned to project outwardly. This causes the clamp and conduit to firmly engage with each other.

Other and ancillary objects of the invention will appear hereinafter, the scope of the invention intended to be secured hereby, being indicated in the appended claims.

In the accompanying drawing which illustrates the invention—

Fig. 1 is a side elevation of a structure embodying the invention including a support, a conduit and a clamp securing the conduit and support, the conduit and support being broken away;

Fig. 2 is a section on the line 2—2 of Fig. 1;

Fig. 3 is an end elevation of the clamp in the position which it assumes in securing the conduit;

Fig. 4 is a top plan view of the clamp as shown and positioned in Fig. 3;

Fig. 5 is an end elevation of the clamp in the form which it has before application to the securing of the conduit; and Fig. 6 is a section, on an enlarged scale, on the line 6—6 of Fig. 5.

Referring to the drawing, 1 is a supporting bar which may be a brace bar between the cylinders of a radial engine, such as used on aeroplanes, and this bar may be tubular as shown, or solid. This bar 1 has an integrally formed thin projecting fin 2 to which a radio shielding conduit 3 for an ignition wire of the engine is secured. This conduit may be a metal tube of the construction as shown in Fig. 5 of the patent to Louis H. Brinkman No. 1,340,818, patented May 18, 1920, such conduit comprising a corrugated, metal tube surrounded by a covering of braided metal strips.

The conduit 3 is secured to the support by means of a clamp formed of a strip of thin sheet metal and having the encircling portion 4 which surrounds the conduit 3, such encircling portion having ears 5 and 6, which are substantially straight longitudinally of the strip, at its ends. The ears are provided with holes 7 and 8 for the passage of a securing bolt 9.

The encircling portion 4 of the clamp has the projections 10 extending inwardly from its inner surface. Such projections may readily be formed, the metal being thin, in a die or by applying a prick-punch to the outside of the encircling portion and striking it with a hammer when the metal will be forced inwardly to form projections 10, and of course a depression 11 upon the outside of the encircling portion will be simultaneously formed with the forcing inwardly of each projection 10.

In the clamp, the marginal portions 12 and 13 are bent or caused to extend outwardly, the intermediate portion 14 being substantially straight or rectilinear in cross section, these outwardly extending marginal portions 12 and 13 in conjunction with the intermediate portion 14 causing the clamp strip to be exteriorly concave in cross section (see Fig. 6). The outwardly extending marginal portions 12 and 13 extend substantially throughout the length of the strip forming the clamp, including the conduit encircling portion and the ears.

The clamp, in the form as shown in Fig. 5, having been placed about the conduit, the bolt 9 is passed through the hole 15 in the lug 2 and through the holes 7 and 8 in the clamp ears 5 and 6. A nut 16 is then applied to the bolt which can be screwed up by a screw-driver inserted in the slot 17. It will be seen that the nut, being between the outwardly extending marginal portions 12 and 13 will be prevented from turning after the nut has been tightened up on the bolt to secure the clamp in its position to hold the conduit so that there will be no danger of accidental turning of the nut and loosening of the clamp. Also in bolting the clamp in securing position the nut may be placed between the outwardly extending marginal portions 12 and 13 and the bolt screwed home in it by a screw driver applied to the other end of the bolt, the outwardly extending portions 12 and 13 preventing the turning of the nut in this operation.

With this assembly, the tightening up of the bolt will draw the clamp ears 5 and 6 toward each other and against the lug or fin 2 on the support, and the portion of the clamp encircling the conduit will be drawn tightly against the conduit so as to firmly grip the same, and the inwardly extending projections will even penetrate in between the strands of the external braid so as to interlock the conduit with the clamp to prevent relative longitudinal sliding.

The concavity of the clamp in cross section causes it to be firmer in holding its shape, in gripping the conduit and in forcing the inwardly extending projections into engagement with the conduit.

It will be seen that when the clamp is assembled with the conduit that the rectilinear or straight intermediate portion 14 of the clamp will lie flat against the conduit so as to form a relatively broad and firm engagement therewith. Also on account of the marginal portions extending outwardly, the edges of the clamp will not lie closely against the conduit so that wear or cutting of the latter by the edges of the clamp will be avoided. The result of the assembling of the clamp, conduit and support as decribed is that a firm and secure fastening of the conduit to the support is obtained, and undue wear of the conduit by coming against the edges of the clamp is avoided, and this by means of a clamp which is light in weight and of small cost and which lends itself readily to manufacturing processes.

While the invention has been illustrated in what is considered its best application it may have other embodiments without departing from its spirit and is not, therefore, limited to the structures shown in the drawing.

What I claim is:

1. A supporting clamp for a conduit or the like comprising an encircling portion having ears at its extremities, said portion being a strip of metal which is outwardly concave in cross section to provide marginal edges whose undersurfaces extend outwardly of the conduit or the like encircled thereby, the encircling portion intermediate said edges having inwardly extending projections adapted to grip the conduit, and a bolt and nut means passing through said ears for drawing the same together.

2. A supporting clamp for a conduit or the like comprising an encircling portion having ears at its extremities, said portion being a strip of metal which is outwardly concave in cross section to provide marginal edges whose undersurfaces extend outwardly of the conduit or the like encircled thereby, the encircling portion intermediate said edges being substantially flat to bear against said conduit, said flat intermediate portion being provided with projections adapted to grip the conduit, and a bolt and nut means passing through said ears for drawing the same together.

3. A supporting clamp for a conduit or the like comprising an encircling portion having ears at its extremities, said encircling portion and ears being a strip of metal which is outwardly concave in cross section to provide marginal edges whose undersurfaces extend outwardly of the conduit or the like within the encircling portion, the encircling portion intermediate said edges having inwardly extending projections adapted to grip the conduit, a bolt extending through holes in said ears, and a nut threaded to said bolt and lying between said marginal edges and being prevented from turning by engagement with said edges.

DAVID INGALLS.